(12) United States Patent
Maurischat

(10) Patent No.: US 10,641,678 B2
(45) Date of Patent: May 5, 2020

(54) TESTING DEVICE AND METHOD FOR TESTING THE TIGHTNESS OF CONTAINERS

(71) Applicant: Robert Bosch GmbH, Stuttgart (DE)

(72) Inventor: Wolfgang Maurischat, Satteldorf (DE)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 15/748,348

(22) PCT Filed: May 24, 2016

(86) PCT No.: PCT/EP2016/061661
§ 371 (c)(1),
(2) Date: Jan. 29, 2018

(87) PCT Pub. No.: WO2017/016701
PCT Pub. Date: Feb. 2, 2017

(65) Prior Publication Data
US 2018/0217022 A1 Aug. 2, 2018

(30) Foreign Application Priority Data
Jul. 29, 2015 (DE) .................. 10 2015 214 348

(51) Int. Cl.
*G01M 3/32* (2006.01)
*B07C 5/34* (2006.01)

(52) U.S. Cl.
CPC ........... *G01M 3/329* (2013.01); *B07C 5/3404* (2013.01); *B07C 5/3408* (2013.01)

(58) Field of Classification Search
CPC ........... G01N 3/12; G01M 3/32; G01M 3/329
See application file for complete search history.

(56) References Cited

U.S. PATENT DOCUMENTS 2,606,657 A * 8/1952 Berthelsen .............. B07C 5/124
209/532
3,826,126 A * 7/1974 Yasuhiro .................. G01N 3/12
73/37
4,184,362 A * 1/1980 Standley ............... G01M 3/202
73/40.7

(Continued)

FOREIGN PATENT DOCUMENTS

CN 102145811 A 8/2011
DE 3925494 A1 2/1991
(Continued)

OTHER PUBLICATIONS

International Search Report for Application No. PCT/EP2016/061661 dated Jul. 25, 2016 (English Translation, 2 pages).

*Primary Examiner* — John Fitzgerald
(74) *Attorney, Agent, or Firm* — Michael Best & Friedrich LLP

(57) ABSTRACT

The invention relates to a testing device for testing the tightness of containers (2), comprising a supply unit (3) for supplying the containers (2), a testing unit (4) for testing the tightness of the containers (2), a diverting unit (5) for diverting tested tight containers (2), and a discharge unit (6) for discharging containers (2') tested to be untight in the testing unit (2). The testing unit (4) has at least one individual testing chamber (42) for testing individual containers and at least one multiple testing chamber (41) for receiving a plurality of containers in order to simultaneously test multiple containers (2). The testing device also comprises a control unit (10) which is designed to supply possibly untight containers (2') which have been discharged by means of the discharge unit (6) from a multiple testing chamber (41) individually back into an individual testing chamber (42) in order to carry out an individual test of said containers.

12 Claims, 3 Drawing Sheets

(56) References Cited

U.S. PATENT DOCUMENTS

| | | | | |
|---|---|---|---|---|
| 4,459,843 A * | 7/1984 | Durham | G01M 3/3236 | 73/37 |
| 4,602,499 A * | 7/1986 | Norton | G01M 3/3236 | 198/502.1 |
| 4,637,249 A * | 1/1987 | Ishizaki | G01M 3/3236 | 73/41 |
| 4,715,215 A * | 12/1987 | Perhach | G01M 3/363 | 73/45.4 |
| 5,388,446 A * | 2/1995 | Kronberg | G01M 3/229 | 73/40.7 |
| 6,427,524 B1 * | 8/2002 | Raspante | G01M 3/3218 | 73/45.4 |
| 6,578,407 B1 * | 6/2003 | McTaggart | G01M 3/025 | 73/40 |
| 6,666,071 B1 * | 12/2003 | McCormick | G01M 3/3209 | 73/41 |
| 6,722,184 B2 * | 4/2004 | Bennett | G01M 3/186 | 324/414 |
| 8,692,186 B2 * | 4/2014 | Lehmann | G01M 3/202 | 250/281 |
| 8,975,576 B2 * | 3/2015 | Lehmann | G01M 3/202 | 250/281 |
| 10,012,560 B2 * | 7/2018 | Lehmann | G01M 3/205 | |
| 2005/0115305 A1 * | 6/2005 | Nothhelfer | G01M 3/227 | 73/41 |
| 2012/0037796 A1 * | 2/2012 | Lehmann | G01M 3/202 | 250/282 |
| 2015/0177093 A1 | 6/2015 | Lehmann | | |

FOREIGN PATENT DOCUMENTS

| | | |
|---|---|---|
| DE | 69734953 | 9/2006 |
| JP | 01015626 A * | 1/1989 |
| JP | 6415626 | 1/1989 |

* cited by examiner

TESTING DEVICE AND METHOD FOR TESTING THE TIGHTNESS OF CONTAINERS

BACKGROUND OF THE INVENTION

The present invention relates to a testing device for testing the tightness of containers, and to a respective testing method for testing tightness.

In the case of packaged goods, for example in the case of pharmaceutical products, quality testing of the container in terms of the tightness thereof often has to be carried out. To this end, the possibilities of tightness testing with positive pressure or with negative pressure (vacuum) are fundamentally possible herein, and a container that has been filled and closed at normal pressure is subjected to a vacuum in a closed chamber, for example. A certain waiting time is then observed, and a change in pressure per unit of time in the vacuum range is measured. It is a characteristic of a tight container when the vacuum pressure remains constant. However, assuming a tight chamber, when the vacuum pressure rises this is a sign of a leakage of the container because a measurable equalization of pressure between the interior of the container and the vacuum chamber is performed by way of untight points in the container, for example holes or cracks, etc. In the case of a tightness test with positive pressure, in the case of an untight container and assuming a tight chamber, a pressure drop arises in the chamber, since the pressure medium by way of a crack or the like reaches the interior of the container, an equalization of pressure thus taking place. In order for the method to be able to be carried out in an economical manner, simultaneous testing of a plurality of containers in one chamber is disclosed in DE 3925494 A1, for example. However, the problem arises herein that to date, when one of the containers is untight, all of the containers have been considered untight and all containers are disposed of. However, this is often a waste of resources since the other containers would actually be usable when only one of the containers is untight.

SUMMARY OF THE INVENTION

By contrast, the testing device according to the invention has the advantage that a very high output rate is possible, on the one hand, and only those containers which are really untight are actually removed from further processing, on the other hand. On account thereof, resources are saved and only the damaged containers are actually deselected. This is achieved according to the invention in that the testing device has a testing unit for which testing chambers for a plurality of containers and testing chambers for individual testing are provided. Additional individual testing of containers can thus also be carried out simultaneously during the normal multiple testing. The testing device herein, apart from the testing unit, comprises a feeding unit for feeding the containers, and a discharge unit for discharging tested containers. Furthermore, an evacuation unit is provided in order for containers that have tested as untight in the testing unit to be evacuated. A control unit is provided and specified for returning containers that have been evacuated by means of the evacuation unit from a multiple testing chamber individually to an individual testing chamber of the testing unit. On account thereof, the containers that have been tested in the multiple chamber and have been tested as untight can thus be individually retested, and the actually untight container(s) can then be removed from the production process.

The feeding unit preferably has a first star wheel in order for the containers to be fed.

The feeding unit particularly preferably comprises a first star wheel and a second star wheel. The containers for the multiple testing chambers herein are fed by means of the first star wheel, and the containers for the individual testing chamber are fed by means of the second star wheel. On account thereof, independent feeding to the multiple testing chambers and to the individual testing chambers, respectively, can be enabled.

The testing device furthermore preferably comprises an intermediate store for receiving containers that have been evacuated by means of the evacuation device. The evacuated containers are temporarily stored in the intermediate store in order to enable a resting phase in which an equalization of pressure between an untight container and the atmospheric pressure is possible. The containers are then subjected to individual testing only once a predetermined period in the resting phase has elapsed.

The control unit is furthermore preferably also specified for feeding the containers from the intermediate store to the testing unit for individual testing.

The first and the second star wheel furthermore are preferably mechanically intercoupled. On account thereof, a fixed parameter in terms of the sequence of multiple testing chambers and individual testing chambers can be established, on account of which the controlling of the testing devices is significantly simplified.

The testing device furthermore preferably comprises a robot for handling evacuated containers. It is possible herein that the evacuation unit preferably exclusively comprises the robot and retrieves the tested containers that have tested as untight from the testing unit.

Alternatively, the evacuation unit can also comprise an evacuation wheel.

Furthermore preferably, an individual testing chamber has precisely one single receptacle for one container. Alternatively, the individual testing chamber can also have a plurality of receptacles for containers, but wherein only a single receptacle is filled for individual testing. On account thereof, a testing chamber that is conceived as a multiple testing chamber per se then becomes an individual testing chamber.

The present invention furthermore relates to a method for testing the tightness of containers in a testing unit with individual testing and multiple testing. According to the method according to the invention, the containers are first fed to multiple testing, such that a plurality of containers in terms of the tightness thereof can be tested simultaneously in a multiple testing chamber. The containers that have been tested in the multiple testing chamber are evacuated and subsequently treated as containers that have tested as potentially untight when the test has resulted in a leakage. The potentially untight tested containers are subsequently fed to the testing unit once again, however in each case individually for individual testing in order to establish which of the containers that have tested as potentially untight is/are really untight. The actually untight container(s) is/are subsequently removed from the further production procedure. The same advantages as apply to the testing device according to the invention apply herein to the method according to the invention.

According to the method according to the invention the potentially untight containers that have been evacuated, prior to being fed once again to the testing unit, preferably are first temporarily stored, for example in an intermediate store, in order for an equalization of pressure in relation to the ambient pressure to be enabled in the untight container(s). The intermediate storage herein should preferably be for one or a plurality of minutes.

BRIEF DESCRIPTION OF THE DRAWINGS

Preferred exemplary embodiments of the invention will be described in detail hereunder with reference to the appended drawing. In the drawing.

DETAILED DESCRIPTION

A testing device 1 according to a first preferred exemplary embodiment of the invention will be described in detail hereunder with reference to FIGS. 1 and 2.

Figure 1:
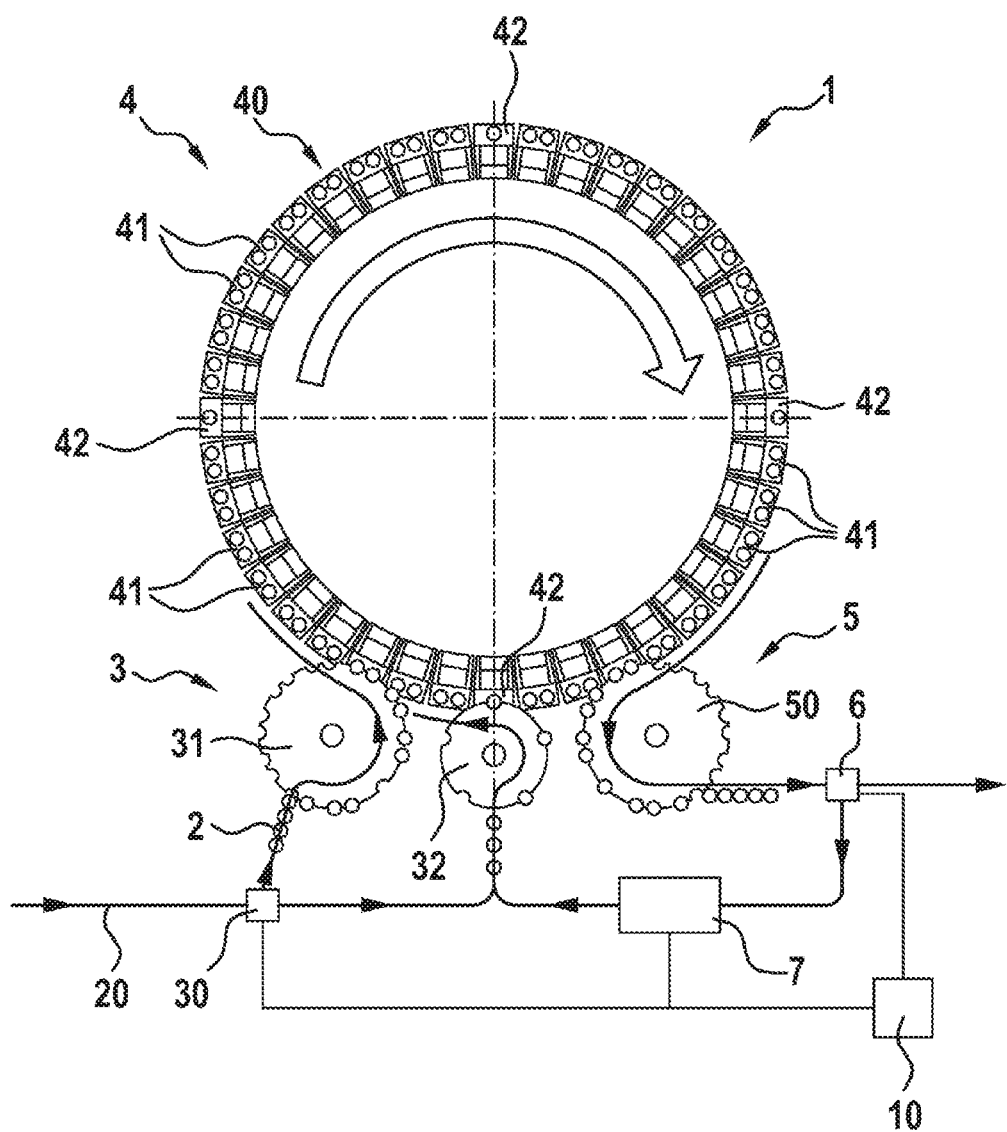
FIG. 1 shows a schematic plan view of a testing device according to a first exemplary embodiment of the invention.
Figure 2:
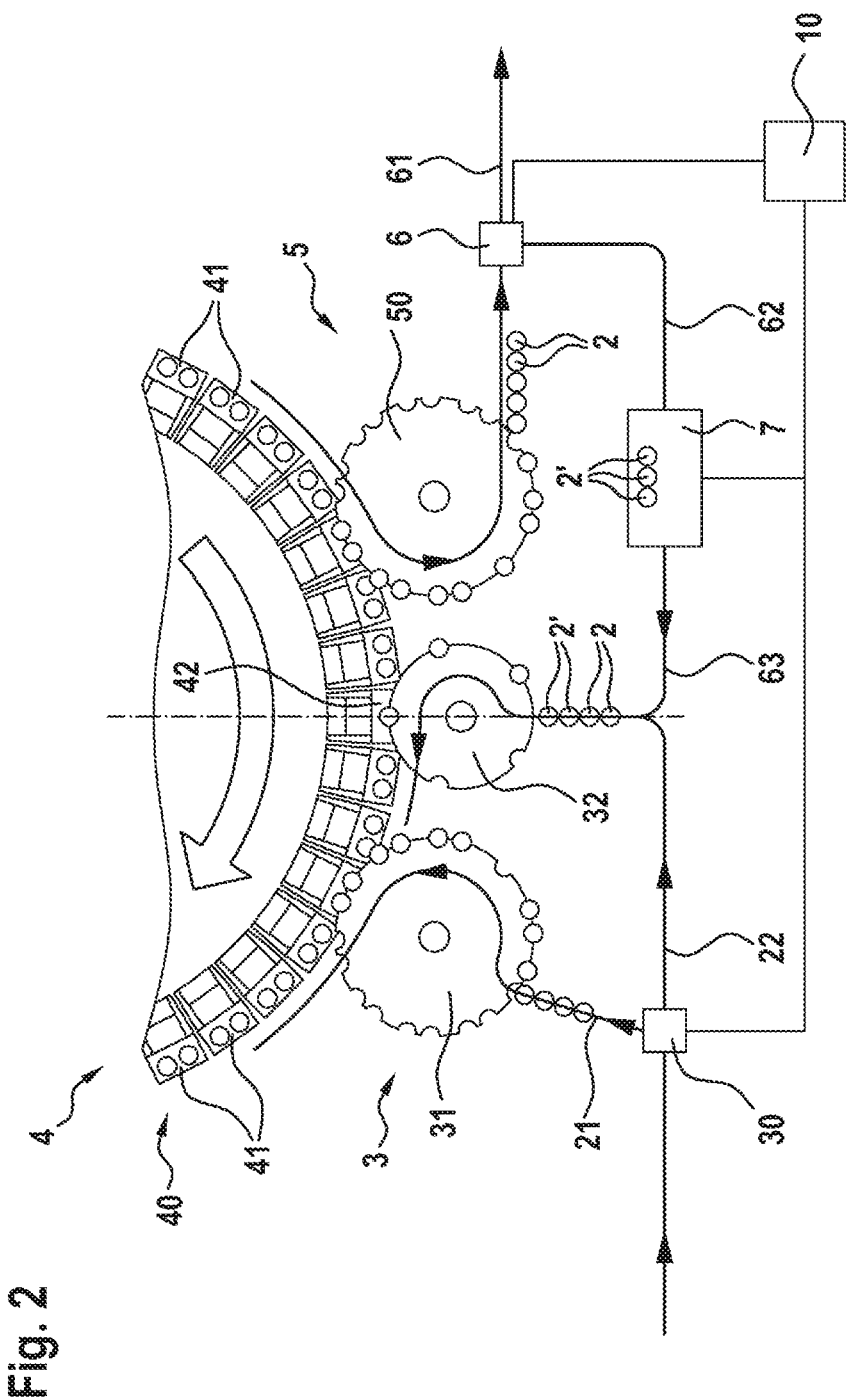
FIG. 2 shows a schematic enlarged view of the testing device of FIG. 1.

As can be seen from FIGS. 1 and 2, the testing device 1 comprises a feeding unit 3 in order for containers 2 which contain, for example, a medicine and are closed, to be tested for tightness. The containers 2 by way of an infeed path 20 (not illustrated in more detail) are fed to a turnout 30. At the turnout 30, the containers 2 to be tested can be transferred to a first route 21 or to a second route 22 (cf. FIG. 2). The first route 21 herein leads to a first star wheel 31. The second route 22 leads to a second star wheel 32.

The testing device 1 furthermore comprises a testing unit 4 which in this exemplary embodiment is configured as a rotary magazine 40. A multiplicity of testing chambers are disposed herein along the circumference of the rotary magazine 40. More specifically, the testing unit 4 comprises a multiplicity of multiple testing chambers 41 and four individual testing chambers 42. The individual testing chambers herein serve for testing single containers 2. The individual testing chambers 42 in this exemplary embodiment are configured in such a manner that said individual testing chambers 42 have precisely only one receptacle for one container.

The multiple testing chambers 41 herein in each case comprise two receptacles for two containers 2 such that two containers can be tested simultaneously.

The arrangement of the multiple testing chambers 41 and of the individual testing chambers 42 is provided in a predetermined timed cycle.

As can be seen in particular from FIG. 2, the first star wheel 31 herein serves for filling the multiple testing chambers 41, and the second star wheel 32 serves for filling the individual testing chambers 42.

After filling, the testing chambers are closed and placed in a vacuum. Each testing chamber herein has a sensor for detecting a change in pressure. Should one of the containers have a leak or a crack or the like, the pressure rises in the testing chamber such that the pressure sensor can detect the resulting change in pressure in the chamber and can use this item of information for determining a leakage of a container 2.

The testing device 1 furthermore comprises a discharge unit 5 which has a third star wheel 50. The discharge unit 5 herein leads to an evacuation unit 6 which evacuates containers which during the pressure test have been identified as potentially untight. Containers which in this manner have been identified as potentially untight are provided with the reference sign 2' in FIG. 2.

The evacuation unit 6 herein can transfer the containers 2' that have been identified as potentially untight to a return path 62. The containers 2 that have been identified as correct and tight are discharged for further processing according to a path 61.

The return path 62 herein leads to an intermediate store 7 in which the containers 2' that have been identified as potentially untight are temporarily stored. The intermediate storage herein has the purpose of enabling an equalization of pressure between the potentially untight container and the atmosphere. After a predetermined period, for example one minute, the containers 2' are then fed to the second star wheel 32 by way of a path 63.

On account thereof, the potentially untight containers 2' can be singularized on the second star wheel 32 and in individual testing chambers 42 be fed to the testing unit 4 and be subjected to a repeat test.

In order for the individual testing chambers 42 not to potentially run empty, for example if no leakage is detected, containers 2 that have not yet been tested can also be fed to the individual testing chambers 42 by way of the second route 22.

A control unit 10 which controls both the turnout 30 as well as the evacuation unit 6 is provided herein according to the invention. The control unit 10 likewise controls the onward transportation, or the feed by way of the path 63, respectively, of the potentially untight containers.

Testing chambers for multiple testing of containers, as well as testing chambers for individual testing of individual containers are thus provided according to the invention within the testing device 1 in the testing unit 4. It is to be noted that it is also possible for the multiple testing chambers 41 to be able to be filled with only a single container 2 to be tested, should a multiplicity of containers have been identified as potentially untight.

Furthermore, it is also possible for specimen containers to be stored in the intermediate store 7, said specimen containers then in preprogrammed procedures being able to be incorporated into gaps created in the feed path in order for the testing chambers per se to be tested in terms of the functioning of the latter. On account thereof, testing of the testing chambers in terms of the functioning (tightness) thereof can be carried out in the ongoing operation under realistic conditions.

The first star wheel 31 and the second star wheel 32 are preferably fixedly coupled in a mechanical manner such that there is a rigid mechanical coupling between the star wheels and the rotary magazine 40 and said rigid mechanical coupling can be used for enabling a synchronization in the feed of the containers to the testing unit 4.

The third star wheel 50 can preferably also have a dedicated autonomous drive in order to enable handling of the containers, for example by way of a robot (not shown), also when the testing device is stationary.

Figure 3:
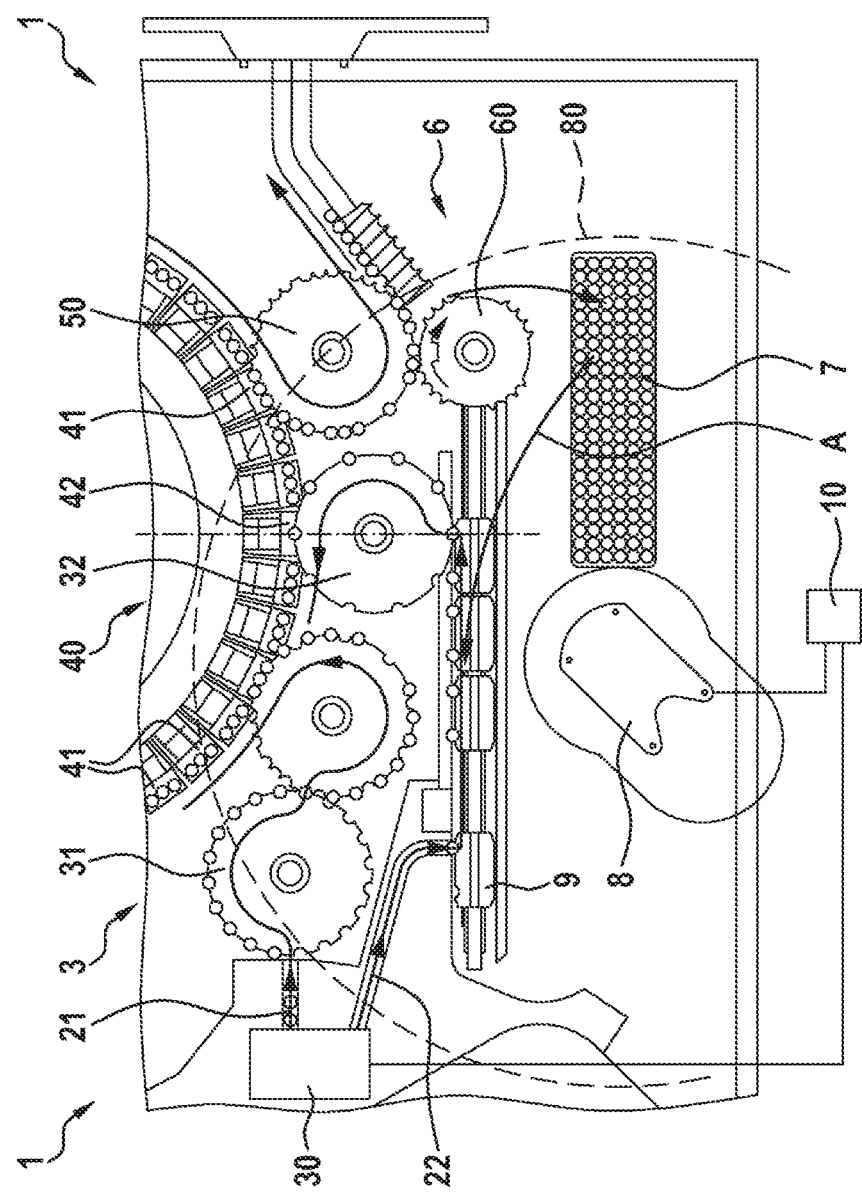
FIG. 3 shows a schematic plan view of a testing device according to a second exemplary embodiment of the invention.

FIG. 3 shows a testing device 1 according to a second exemplary embodiment of the invention. Identical or functionally identical parts, respectively, are identified herein by the same reference signs. As can be seen from FIG. 3, the basic construction of the testing device is similar to the construction in the first exemplary embodiment. Another robot 8 which assumes the handling tasks between the evacuation unit 6 and the intermediate store 7, and the intermediate store 7 and the potentially untight containers 2' that are to be fed to the infeed path of the second route 22, is additionally provided in the second exemplary embodiment. The multiple testing chambers 41 in this exemplary embodiment can in each case receive three containers to be tested. The robot 8 has an accessibility curve 80 that is illustrated in dashed lines. The robot 8 is likewise controlled by way of the control unit 10. The evacuation unit 6 of this exemplary embodiment herein comprises an additional evacuation wheel 60. A singularization wheel 33 is furthermore provided on the feeding unit 3.

The second route 22 herein leads to a linear slide system 9 which can generate empty spaces into which the robot 8 can feed potentially untight containers 2' that are to be tested once again. This is indicated by the arrow A.

Containers which are potentially untight can thus be tested once again individually according to the invention by a testing unit which is integrated in the normal testing unit per se. Regular testing of the functioning of the testing chambers, for example by specimen containers that are temporarily stored in the intermediate store 7, can also be carried out in a simple manner.

The invention claimed is:

1. A testing device for testing the tightness of containers (2), the device comprising
    a feeding unit (3) for feeding the containers (2);
    a testing unit (4) for testing the tightness of the containers (2);
    a discharge unit (5) for discharging tested and tight containers (2);
    an evacuation unit (6) for evacuating containers (2') that have tested as potentially untight in the testing unit (4);
    wherein the testing unit (4) has at least one individual testing chamber (42) configured to receive a single container in order for the single container to be tested, and at least one multiple testing chamber (41) configured to receive a plurality of containers in order for the plurality of containers (2) to be simultaneously tested, wherein the testing unit is configured as a rotary magazine (40), wherein the at least one multiple testing chamber (41) and the at least one individual testing chamber (42) are provided along a circumference of the rotary magazine in a predetermined timed cycle; and
    a control unit (10) which is specified for returning the potentially untight containers (2') that have been evacuated by the evacuation unit (6) from one of the at least one multiple testing chamber (41) individually to one of the at least one individual testing chamber (42) of the testing unit (4), in order for individual testing of said potentially untight containers to be carried out.

2. The testing device as claimed in claim 1, furthermore comprising a robot (8) for handling the containers (2).

3. The testing device as claimed in claim 1, characterized in that the at least one individual testing chamber (42) has precisely one single receptacle for receiving one of the individual containers.

4. The testing device as claimed in claim 1, furthermore comprising a robot (8) for handling the potentially untight containers (2').

5. The testing device as claimed in claim 1, furthermore comprising an intermediate store (7) for receiving and temporarily storing the potentially untight containers (2') which are evacuated by the evacuation unit (6).

6. The testing device as claimed in claim 5, characterized in that the control unit (10) is specified for feeding the potentially untight containers from the intermediate store (7) to the at least one individual testing chamber (42).

7. The testing device as claimed in claim 1, characterized in that the feeding unit (3) has at least one first star wheel (31) in order for the containers (2) to be fed.

8. The testing device as claimed in claim 7, characterized in that the feeding unit (3) comprises the first star wheel (31) and a second star wheel (32), wherein the plurality of containers (2) by means of the first star wheel (31) are feedable to the at least one multiple testing chamber (41), and the individual containers by means of the second star wheel (32) are feedable to the at least one individual testing chamber (42).

9. The testing device as claimed in claim 8, characterized in that the first star wheel (31) and the second star wheel (32) are intercoupled in a mechanically rigid manner.

10. A method for testing the tightness of containers (2) in a testing unit (4) configured as a rotary magazine having at least one individual testing chamber (42) configured to receive a single container, and at least one multiple testing chamber (41) configured to receive a plurality of containers, comprising the following method steps:
    providing the at least one individual testing chamber (42) and the at least one multiple testing chamber (41) in a predetermined timed cycle;
    feeding the containers (2) to the multiple testing chamber (41);
    testing the tightness of the containers (2) in the multiple testing chamber (41);
    performing an evacuation of the containers (2') that have tested as potentially untight when the test in the multiple testing chamber (41) has resulted in a leakage; and
    feeding the potentially untight containers (2') individually from the multiple testing chamber (41) to respective individual testing chambers (42) in order for the potentially untight containers to be tested individually for tightness.

11. The method as claimed in claim 10, characterized in that the potentially untight containers (2') prior to being fed to the individual testing chamber (42) are temporarily stored for a predetermined period in order for an equalization of pressure to be enabled.

12. The method as claimed in claim 10, wherein specimen containers for regularly testing the testing chambers are fed from an intermediate store (7) to the testing chambers.

* * * * *